(12) United States Patent
Ryan et al.

(10) Patent No.: US 8,950,437 B2
(45) Date of Patent: Feb. 10, 2015

(54) LEAK SEALING APPARATUS

(75) Inventors: Nicholas John Ryan, Aberdeenshire (GB); Andrew James Cochran, Aberdeenshire (GB); Terrence Francis Stebbings, Aberdeenshire (GB)

(73) Assignee: Seal-Tite, LLC., Madisonville, LA (US)

( * ) Notice: Subject to any disclaimer, the term of this patent is extended or adjusted under 35 U.S.C. 154(b) by 1200 days.

(21) Appl. No.: 12/745,142

(22) PCT Filed: Dec. 3, 2008

(86) PCT No.: PCT/GB2008/051150
§ 371 (c)(1),
(2), (4) Date: Sep. 22, 2010

(87) PCT Pub. No.: WO2009/071944
PCT Pub. Date: Jun. 11, 2009

(65) Prior Publication Data
US 2011/0198812 A1    Aug. 18, 2011

(30) Foreign Application Priority Data
Dec. 3, 2007 (GB) .................................. 0723661.5

(51) Int. Cl.
*F16L 55/18* (2006.01)
*F16L 55/162* (2006.01)
*E21B 33/138* (2006.01)

(52) U.S. Cl.
CPC ............. *F16L 55/162* (2013.01); *E21B 33/138* (2013.01)
USPC ......................................................... 138/97

(58) Field of Classification Search
USPC .......................................................... 138/97
See application file for complete search history.

(56) References Cited

U.S. PATENT DOCUMENTS

| | | | |
|---|---|---|---|
| 2,754,910 A | 7/1956 | James et al. | |
| 3,144,049 A | 9/1964 | Ginsburgh | |
| 3,472,285 A * | 10/1969 | Ginsburgh et al. | 138/97 |
| 3,645,331 A * | 2/1972 | Maurer et al. | 175/65 |
| 4,505,334 A | 3/1985 | Doner et al. | |
| 5,253,709 A | 10/1993 | Kendrick et al. | |
| 5,485,882 A * | 1/1996 | Bailey et al. | 166/284 |
| 7,810,523 B2 * | 10/2010 | McEwan et al. | 138/97 |
| 2007/0169935 A1 * | 7/2007 | Akbar et al. | 166/284 |
| 2010/0200235 A1 * | 8/2010 | Luo et al. | 166/284 |
| 2012/0067447 A1 * | 3/2012 | Ryan | 138/97 |

FOREIGN PATENT DOCUMENTS

| | | |
|---|---|---|
| GB | 1101870 A | 1/1968 |
| WO | WO 01/86191 A1 | 11/2001 |
| WO | WO 03/093713 A2 | 11/2003 |

* cited by examiner

Primary Examiner — James Hook
(74) Attorney, Agent, or Firm — Baker & Hostetler LLP

(57) ABSTRACT

An apparatus includes one or more sealing elements to be transported along a duct by the flow of fluid therein at an internal pressure and to be drawn to a leak by the pressure differential resulting from a reduced pressure associated with the locality of that leak. Each sealing element has a body formed from an elastic material to have one or more impermeable bubbles filled with gas so that the sealing element has a volume which varies resiliently according to the change in volume of the bubble(s) in response to externally applied pressure. The product of the volume of the bubble(s) and the pressure of the gas therein is selected to provide a sealing element having a transport volume at the internal pressure which is appropriate to enter a leak and which, in response to the reduced pressure associated with the locality of that leak, is capable of increasing in volume from the transport volume sufficiently to seal that leak.

19 Claims, 4 Drawing Sheets

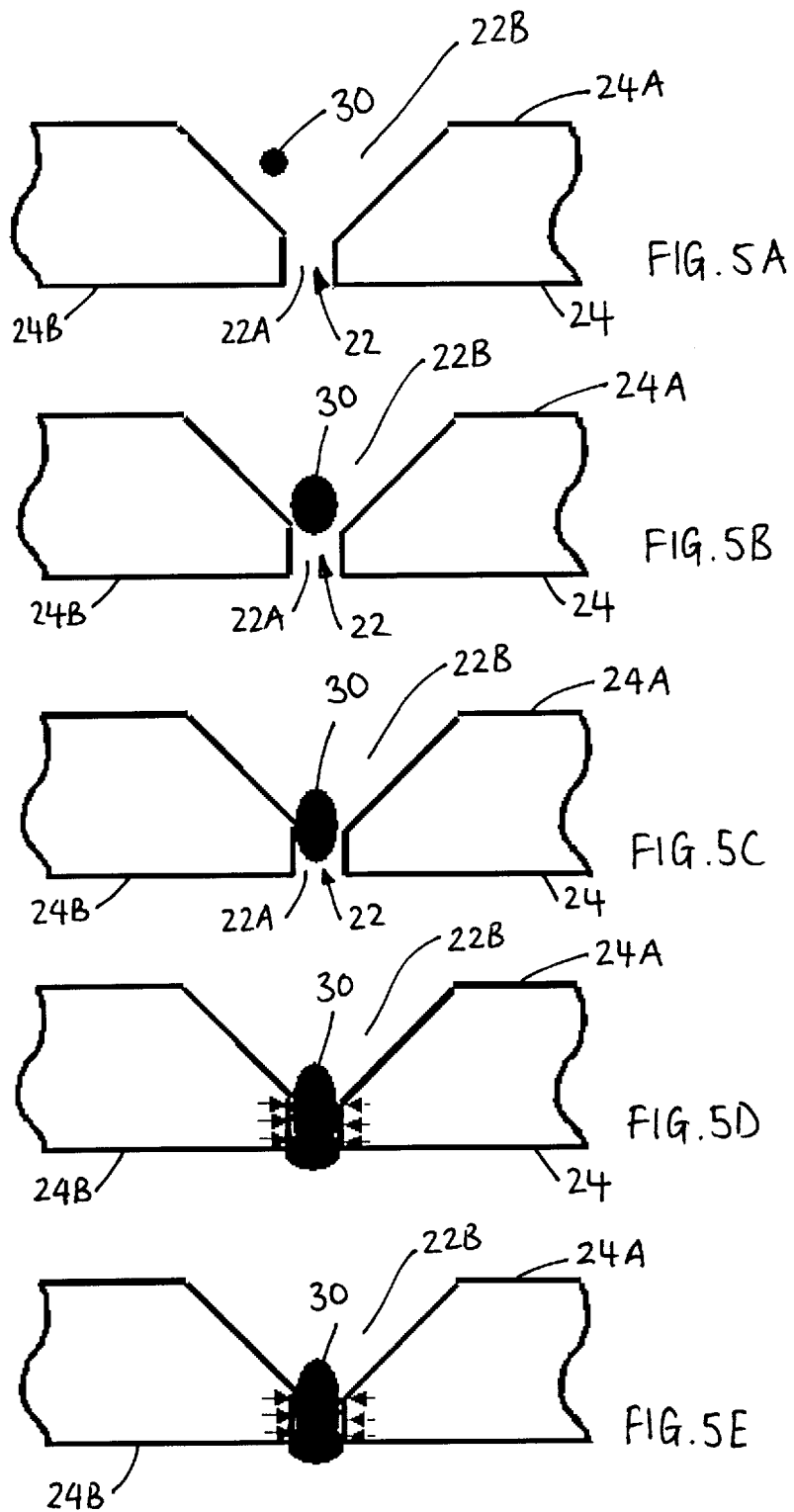

LEAK SEALING APPARATUS

CROSS-REFERENCE TO RELATED APPLICATIONS

This application is the National Stage of International Application No. PCT/GB2008/051150 filed Dec. 3, 2008, which claims the benefit of Great Britain Application No. 0723661.5, filed Dec. 3, 2007, the disclosures of which are incorporated herein by reference in their entireties.

The present invention relates to an apparatus for sealing leaks in fluid-carrying ducts.

Ducts which transport fluids, such as oil and natural gas pipes, can extend for many kilometers in hostile or inaccessible environments such as the arctic tundra or immersed in the sea. It is therefore often impractical, and/or prohibitively expensive, to fix a leak in the duct by having a service engineer visit the site of the leak and repair the duct.

It is known instead to introduce a number of sealing elements into the fluid being transported by the duct such that the pressure differential caused by the leak will draw one or more of the elements to the site of the leak to stem or seal the leak.

For example, U.S. Pat. No. 3,144,049 discusses injecting a plurality of plugs into a liquid transporting duct for the purpose of sealing leaks in the duct. To improve the reliability with which the plugs are diverted out of the main flow toward the leaks, the plugs are made to have a bulk density substantially equal to that of the liquid flowing in the duct. This is achieved by forming the plugs from a sponge-like material with a porous cellular structure, so that the sealing elements will be filled with the liquid that is transported through the ducts.

WO 01/86191 and WO 03/093713 also disclose sealing elements which can be injected into a fluid transporting duct such that the pressure differential caused by the leak will draw one or more of the elements to the site of the leak to stem or seal the leak.

In the prior art, the sealing elements are held in place by the high pressure of the fluid being transported by the duct relative to the pressure outside the duct.

However, in practice, in some ducting systems, the pressure of the fluid inside the duct may vary significantly depending on the amount of fluid being transported. Thus, if sealing elements such as those disclosed in WO 01/86191 and WO 03/093713 are used, circumstances can arise in which the sealing elements are no longer held at the site of the leak, resulting in the leak being reopened. Further, in some ducting systems, such as deep sea pipelines, the pressure outside the duct can approach or exceed the pressure of the fluid inside the duct, such that the sealing elements disclosed in WO 01/86191 and WO 03/093713 are not effective for sealing leaks.

A possible solution to these problems is to provide the sealing elements with some form of bonding means for maintaining the sealing elements at the leak site.

GB 1 101 870 discloses sealing elements formed of a soft resilient material surrounded by an outer plastic layer. Under pressure, this layer plastically deforms into the leak. GB 1 101 870 also discloses sealing elements which are penetrated by fibres that help to hold the sealing elements in place at the leak site. As with U.S. Pat. No. 3,144,049, the sealing elements of GB 1 101 870 may comprise a cellular material whose density can be similarly adjusted by boiling or immersing the sealing element in a suitable liquid.

A further possible solution to these problems is to provide the sealing elements with some form of a bonding agent to form a bond between the sealing element and the inner surface of the duct, to hold the sealing element in place. However, bonding agents are expensive and can be unreliable as they require some form of activation.

According to one aspect of the present invention, there is provided apparatus for controlling leakage from a duct carrying a fluid at an internal pressure, said apparatus comprising:— one or more sealing elements to be introduced into the duct and suitable for transport along the duct by the flow of said fluid and suitable for being drawn to a leak by the pressure differential resulting from a reduced pressure associated with the locality of that leak;

characterised in that the one or more sealing elements each comprise:— a body formed from en elastic material to have one or more impermeable bubbles filled with gas so that the sealing element has a volume which varies resiliently according to the change in volume of the bubble(s) in response to externally applied pressure;

and wherein the product of the volume of the bubble(s) and the pressure of the gas therein is selected to provide a sealing element having a transport volume at said internal pressure which is appropriate to enter a leak and which, in response to the reduced pressure associated with the locality of that leak, is capable of increasing in volume from said transport volume sufficiently to seal that leak.

Accordingly, once a sealing element has been drawn into a leak, it is retained within the leak such that the seal holds, even if the internal pressure of the fluid being transported in the duct subsequently drops. That is to say, the seal can withstand a drop in pressure within the duct or an increase in pressure outside the duct, and even a pressure reversal in which the pressure within the duct drops below the pressure outside the duct. The present invention can thus be used to seal leaks in fluid transporting ducts in which the transport pressure fluctuates.

The internal pressure may simply be the transport pressure under which fluid is transported along the duct during normal use. However, in some cases, the internal pressure may be a deployment pressure which is higher than the normal transport pressure. That is to say, the pressure within the duct may be raised whilst the sealing elements are deployed, and then reduced to the normal transport pressure once the leaks have been sealed. The present invention can thus be used in ducts such as deep sea pipelines, in which the external pressure may be similar to, or even higher than, the transport pressure of the duct.

The one or more sealing elements may be selected to have, under said internal pressure, an effective size that is greater than the effective size of the leak. This ensures that an initial seal is created when the sealing element comes into contact with the aperture to be sealed, to thereby trigger the expansion of the sealing element. Once the sealing element is exposed to the external pressure outside the duct, it tries to expand beyond the dimensions of the aperture, such that the sealing element is held in place.

In particular, the one or more sealing elements may be selected to have, under said internal pressure, an effective size that is at least 1.1 times greater than the effective size of the leak. Further, the one or more sealing elements may be selected to have, under said internal pressure, an effective size that is less than 3 times greater than the effective size of the leak.

Alternatively, the one or more sealing elements may be selected to have, under said internal pressure, an effective size that is substantially equal to the effective size of the leak.

Such sealing elements are held in place by friction between the sides of the aperture and the surface of the sealing element, which is related to the lateral forces exerted by the sealing element on the sides of the aperture as it expands.

The effective size of the sealing element may be the maximum cross sectional area thereof and the effective size of the leak may be the minimum cross sectional area thereof in a plane substantially parallel to the transport of the fluid along the duct.

Alternatively, the effective size of the sealing element may be given by:

$$D_E = (a^2 + b^2 + c^2)^{1/2}$$

and the effective size of the leak may be given by:

$$D_L = (x_L^2 + y_L^2)^{1/2}$$

where a, b and c are the dimensions of the sealing element in mutually orthogonal directions, $x_L$ is the maximum dimension of the leak, and $y_L$ is the maximum width of the leak in an orthogonal direction to $x_L$.

The gas in the impermeable bubbles may be lighter than air. The gas may comprise one or more of air, argon, nitrogen, hydrogen or helium. Both the solid material and the gas of the sealing elements may be selected in accordance with the requirements of differing ducts, duct environments and fluid transport parameters.

Different bubbles may encapsulate different gasses. That is to say, the closed cells of the sealing element may be filled with a mixture of these gases, and/or with other gases chosen to accommodate the requirements of the duct, duct environment and/or fluid transport parameters in question. In this respect, sealing elements may be fabricated from individual sections with differing fluid fills.

The properties of the one or more sealing elements may, at least in part, be determined by a manufacturing pressure under which the sealing element(s) are manufactured. In this case, the one or more sealing element(s) may be selected to have a manufacturing pressure that is lower than said internal pressure and higher than an external pressure outside the duct in the region of the leak. The ratio of solid material to fluid material by volume may be between 0.01 and 0.5 at the manufacturing pressure. More specifically, the ratio of solid material to fluid material by volume may be substantially 0.3.

Further, the maximum linear dimension of each impermeable bubble may be less than or equal to 20% of the maximum linear dimension of the respective sealing element.

The one or more sealing elements may be formed of closed cell foam, the closed cells thereof constituting said impermeable bubbles. More specifically, the one or more sealing elements may be formed from expanded Ethylene Propylene Diene Monomer (EPDM).

The sealing elements may be further selected to have substantially the same density as the fluid transported along the duct under said internal pressure. This prevents the sealing element from floating or sinking when deployed in the duct.

According to another aspect of the present invention, there is provided a method of controlling leakage from a duct carrying a fluid, the method comprising:— transporting the fluid along the duct at an internal pressure that is higher than an external pressure outside the duct; and introducing one or more sealing elements into the duct such that the sealing element(s) are transported along the duct by the flow of said fluid and drawn to a leak by the pressure differential resulting from a reduced pressure associated with the locality of that leak;

characterised in that the one or more sealing elements each have a body formed from en elastic material to have one or more impermeable bubbles filled with gas so that the sealing element has a volume which varies resiliently according to the change in volume of the bubble(s) in response to externally applied pressure, and the product of the volume of the bubble(s) and the pressure of the gas therein are selected to provide a sealing element having a transport volume at said internal pressure which is appropriate to enter a leak and which, in response to the reduced pressure associated with the locality of that leak, is capable of increasing in volume from said transport volume sufficiently to seal that leak.

Although the steps of transporting the fluid under the internal pressure and introducing the sealing elements into the fluid are listed in that order, it will be appreciated that appropriate sealing elements may be selected at any time before they are introduced into the duct, and that the pressure within the duct may be set to said internal pressure either before or after the sealing elements are introduced into the fluid.

The internal pressure may be a deployment pressure which is higher than a transport pressure under which the fluid is transported along the duct during normal use.

The present invention can thus be used in ducts such as deep sea pipelines, in which the external pressure may be similar to, or even higher than, the transport pressure of the duct.

Examples of the present invention will now be described in detail with reference to the accompanying drawings in which:—

FIGS. 5a to 5e show a cross-section through a portion of a duct wall with an aperture which causes a leak when fluid is transported along the duct, and schematically illustrate the movement of a sealing element with respect to the aperture in accordance with a second embodiment of the invention;

Figure 7:
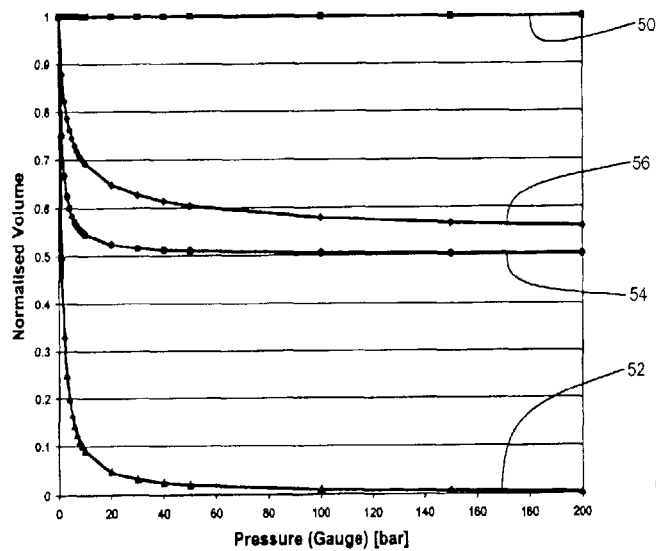
Figure 8:
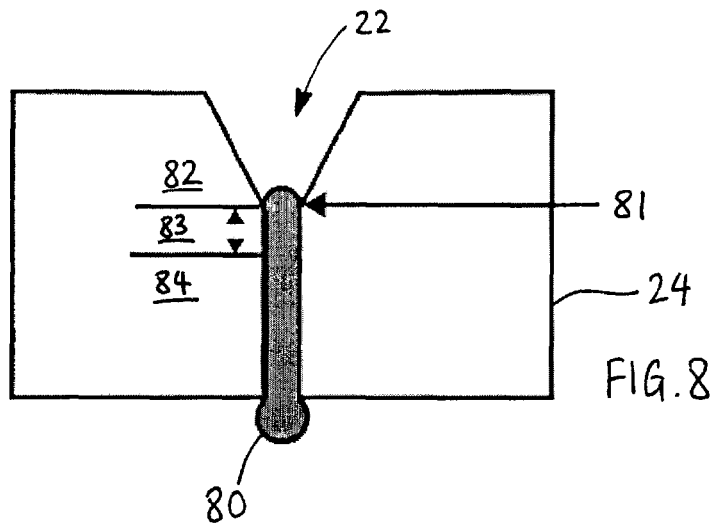

FIG. 7 is a graph which illustrates the expansion of sealing elements of varying composition under various pressures in accordance with embodiments of the invention, as compared to an ideal solid and an ideal gas; and FIG. 8 shows a cross-section through a portion of a duct wall with an aperture which causes a leak when fluid is transported along the duct, and illustrates the different pressure zones that are present when the leak is sealed by a sealing element of the present invention.

In the figures, common reference numbers have been used to refer to elements common to different figures and embodiments.

In a typical fluid-carrying pipeline or duct, fluid is conveyed under high pressure in order to provide sufficient energy to overcome friction losses over the entire length of the line. In a first type of pipeline, fluid is transported under a transport or operational pressure $P_{int}$, which will typically be very high relative to the pressure immediately outside the duct (the external pressure $P_{ext}$). This means that when a leak occurs due to an aperture in the duct wall, the pressure drop across that aperture will be very abrupt.

In this respect, for a fluid stream through the aperture, assuming negligible energy losses, $$P + \tfrac{1}{2}\rho v^2 = \text{constant} \qquad (1)$$

where P is pressure, ρ is density and v is velocity.

For flow through an aperture, $$Q = A C_d \sqrt{[2(P_{int} - P_{ext})/\rho]} \qquad (2)$$

where Q is the flow rate through the aperture, A is the cross-sectional area of the aperture and $C_d$ is a coefficient of discharge (typically in the range 0.5 to 0.7, potentially up to 0.98) which depends on the fluid carried by the pipeline.

Since the leakage flow rate through the aperture will be constant, whilst the cross-sectional area of the aperture may vary through the duct wall, using fluid continuity:

$$Q = A(z) v(z) \qquad (3)$$

where A(z) is the cross-sectional area of the aperture at z, v(z) is the wall normal velocity at z, and z is a wall normal co-ordinate with an origin on the outside face of the duct wall.

Therefore, combining (1), (2) and (3):

$$Q = A(z) C_d \sqrt{[2(P(z) - P_{ext})/\rho]} \qquad (4)$$

where P(z) is the pressure at z.

Figure 1:
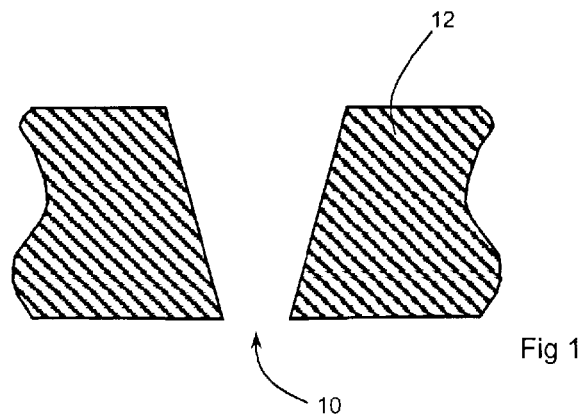
FIG. 1 is a cross-section through a portion of a duct wall with an aperture which causes a leak when fluid is transported along the duct.

These equations allow the fall-off in pressure through the leak to be calculated for a given leak profile. For example, FIG. 1 is a schematic illustration of an aperture 10 which extends through the duct wall 12 which is 20 mm thick. Such an aperture might arise, for example, from a corrosion pit. The leak is defined by the dimensions of the aperture. The aperture is frusto-conical in form, and its longitudinal axis lies perpendicular to the inside surface of the duct wall, and thus coincides with the z-axis (normal to the surface of the duct wall 12). The cross-sectional area of the aperture at the internal surface of the duct wall (i.e., at z=20 mm) is $A_{int}$=100 mm² and the cross-sectional area of the aperture at the external surface of the duct wall (ie, at z=0 mm) is 20 mm.

Figure 2:
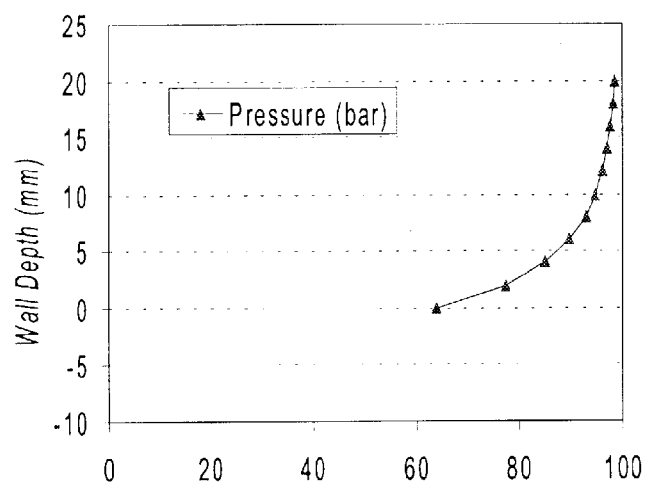
FIG. 2 is a graph showing a typical pressure differential attributable to such a leak as a function of distance through the duct wall.

FIG. 2 illustrates the fall off in pressure for the leak shown in FIG. 1. For the purpose of this example, the external pressure is taken as $P_{ext}$=1 bar (100 kPa), the internal pressure of the pipeline during deployment of the sealing elements (which may simply be the transport or operating pressure of the pipeline) is taken as $P_{int}$=100 bar (10 MPa) and the fluid density is taken as ρ=1000 kg/m³. The abrupt pressure drop across the thickness of the duct wall is clearly illustrated in FIG. 2.

In addition to the abrupt pressure drop across the leak, there will be a zone of reduced pressure inside the duct in the area that surrounds the leak.

Figure 3:
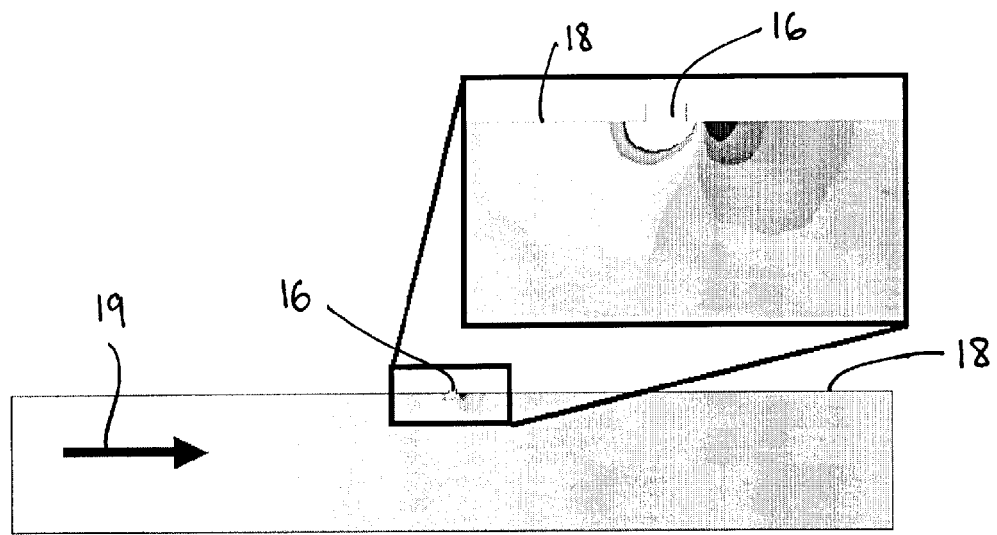
FIG. 3 is an illustration of the pressure contours near a leak through an aperture in a duct wall.

FIG. 3 illustrates the pressure contours near a leak 16 in a duct 18, calculated by numerical simulation. Arrow 19 depicts the direction of flow of fluid in the duct.

FIGS. 4a to 4e show a sealing element 20 suitable for sealing a leak attributable to an aperture in a wall of a fluid pipeline in accordance with a first embodiment of the invention. The sealing element 20 is formed of expanded Ethylene Propylene Diene Monomer (EPDM). The expanded EPDM has a closed cellular structure, whose cells are filled with air.

Expanded EPDM is substantially impermeable to both gas and liquids. Thus, the closed-cellular structure of the sealing element means that the air is effectively sealed within the cells, such that the sealing element comprises a plurality of impermeable air filled bubbles. Moreover, when the sealing element is introduced into a pipeline, the fluid flowing in the pipeline does not penetrate the cells.

The ratio of solid EPDM to gas in the sealing element is selected so that the average density of the sealing element is substantially the same as that of the fluid flowing in the pipeline.

The elastic nature of the EPDM, together with the compressible nature of the air which fills the cells, means that the sealing elements themselves are elastic or resilient. In particular, the volume of the sealing element will vary elastically or resiliently with pressure. That is to say, the change in volume of the sealing element with pressure is not a plastic deformation. Thus, a sealing element that has contracted due to exposure to increased pressure will revert to its original size if the pressure is subsequently reduced to the original level.

Accordingly, when a sealing element is introduced into a fluid pipeline, its volume will decrease due to the high internal pressure within the pipeline and then increase in response to the pressure drop observed at the site of the leak.

In use, one or more of such sealing elements are released into the fluid flowing through the pipeline. When a sealing element flows into the region surrounding a leak, the pressure differential in this region as illustrated in FIG. 3 draws the sealing element towards and into the aperture, where it substantially seals the aperture and subsequently expands to become lodged therein.

The sealing process of the present invention will be described in more detail with reference to FIGS. 4a to 4e.

Figure 4A:
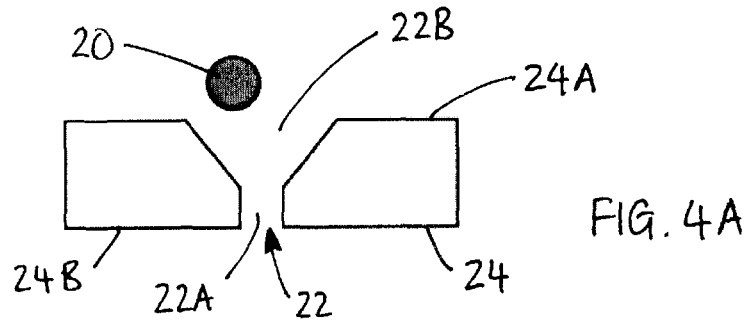
FIGS. 4a to 4e show a cross-section through a portion of a duct wall with an aperture which causes a leak when fluid is transported along the duct, and schematically illustrate the movement of a sealing element with respect to the aperture in accordance with a first embodiment of the invention.

FIG. 4a shows a sealing element 20 approaching a region of reduced pressure surrounding a leak caused by aperture 22 in a duct wall 24. In this example, the sealing element is substantially spherical, with a diameter of 20 mm at atmospheric pressure (approximately 1 bar or 100 kPa), and a diameter of 13 mm at the internal pressure of the pipeline.

The pressure differential in the region near the aperture 22 draws the sealing element 20 towards and into the aperture 22. The aperture 22 illustrated comprises a 10 mm deep conical pit 22B which extends into the duct wall 24 from the interior surface 24A thereof. At the deepest point of the conical pit 22B there is a 10 mm deep cylindrical aperture 22A which extends from the conical pit 22B through the duct wall, and opens onto the external surface 24B thereof, such that a fluid pathway through the duct wall is formed. The cross-sectional area of the aperture 22 is 500 mm² at the internal surface 24A of the duct wall and 20 mm² at the external surface 24B.

For a leak caused by an aperture of these dimensions, in a pipeline operating at 100 bar, the velocity of the fluid escaping from the pipeline through the leak will approach 100 m/s. The time for the sealing element to pass through the conical pit 22B after entering the leak is therefore approximately 0.1 ms (0.01 m÷100 m/s=0.1 ms).

During this short period, the pressure drop is continuous and has a steep gradient. The sealing element continuously reacts to this rapidly changing pressure field.

Figure 4B:
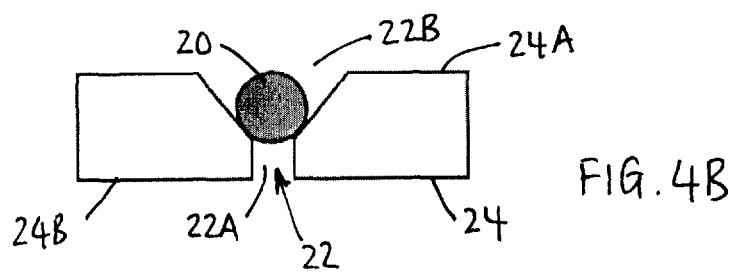

FIG. 4b shows the sealing element 20 at its initial contact with the duct wall 24. At this point, the sealing element is suddenly exposed to the full pressure differential $P_{int} - P_{ext}$.

Figure 4C:
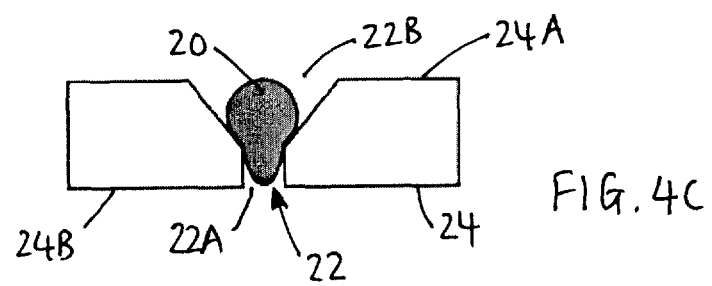

With reference to FIG. 4c, the sudden exposure to the full pressure differential causes the sealing element to expand and deform into the cylindrical aperture 22A.

Figure 4D:
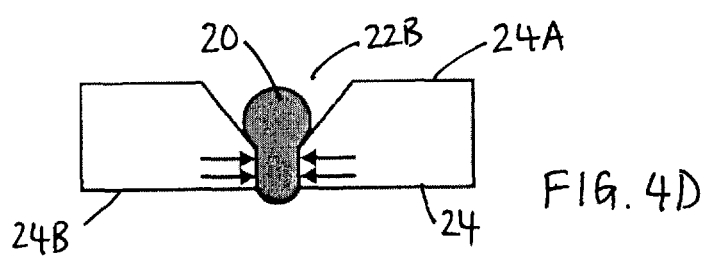

In certain situations, part of the sealing element may expand through the opening of the aperture at the external surface 24B of the pipe wall 24. The portion of the sealing element outside the pipe wall will then expand to form a small bubble or protrusion on the external surface of the pipe, as illustrated in FIG. 4d.

In either case, the rapid expansion due to the abrupt pressure drop through the aperture causes the sealing element to enter the aperture and then to expand to dimensions greater than the corresponding dimensions of the aperture, so that it becomes wedged or plugged within the aperture, where it is held in place by lateral compressive forces exerted by the walls of the aperture, thereby effectively sealing the leak.

Thus, unlike previously known sealing elements, the sealing element 20 is retained in place by the interaction of the sealing element 20 with the pipe wall 24, so that the sealing element is resistant to reduction or reversal of the pressure difference across the aperture forming the leak.

Figure 4E:
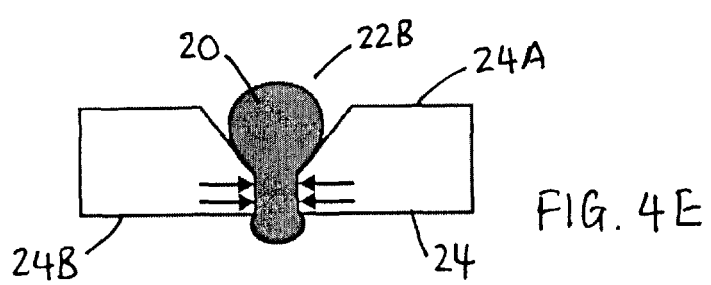

With reference to FIG. 4e, if, after the seal is formed, the internal pressure $P_{int}$ in the pipeline decreases such that it is equal to the external pressure ($P_{int}=P_{ext}$), the sealing element will expand into the interior of the pipeline. However, since the lateral compressive forces exerted by the walls of the aperture are still present (the sealing element being larger than the aperture at $P_{ext}$), the sealing element 20 is held in place, and continues to seal the leak, thereby maintaining the seal between the inside and the outside of the pipe wall, despite the reduction of the pressure within the pipeline.

In this embodiment, the effective size of the sealing element under a pressure equal to the internal pressure of the pipeline during deployment of the sealing elements is larger (and preferably at least 1.1 times larger) than the effective size of the aperture causing the leak (in the above example, the diameter of the cylindrical aperture 22A). This ensures that an initial seal is created when the sealing element comes into contact with the aperture to be sealed, to thereby trigger the above described expansion of the sealing element.

A second embodiment of the present invention is illustrated in FIGS. 5a to 5e. These figures show a sealing element 30 suitable for sealing a leak attributable to an aperture 22 in a wall 24 of a fluid pipeline. In FIGS. 5a to 5e, the size and geometry of the aperture are the same as those of the aperture in FIGS. 4a to 4e. However, in the second embodiment, the effective size of the leak may be less than or, more preferably, approximately equal to the effective size of the aperture at the internal pressure of the pipeline during deployment of the sealing elements. Otherwise, the material properties of the sealing element 30 are the same as those of the sealing element 20 of the first embodiment.

As with the first embodiment, the pressure differential in the region near the aperture draws the sealing element towards and into the aperture. The rapid motion into the duct wall (which is as calculated for the first embodiment) ceases as the sealing element collides with the edge of the cylindrical part of the aperture 22A. At this point, the sealing element impedes the flow through the aperture, but does not fully close the aperture to form a complete seal. The sealing element continues to rapidly shift and adjust as the leak is closed off, whilst the net force due to the pressure difference acting on the sealing element continuously increases. As illustrated in FIG. 5b, the pressure differential caused by the leak acting on the sealing element causes an elongation of the sealing element in the direction of the leak. This process continues until the leak is completely closed by the sealing element blocking the aperture, as illustrated in FIG. 5c. At this time, there is an effective seal between the fluid inside the duct and the fluid outside the duct. At the instant the leak is closed, the sealing element experiences the full pressure differential acting across it (i.e., $P_{int}-P_{ext}$).

As with the first embodiment, in certain situations, part of the sealing element may expand through the opening 30 of the aperture at the external surface 24B of the pipe wall. The portion of the sealing element outside the pipe wall will then expand to form a small bubble or protrusion on the external surface of the pipe, as illustrated in FIG. 5d.

With reference to FIG. 5e, if, after the seal is formed, the internal pressure $P_{int}$ in the pipeline decreases such that it is equal to the external pressure ($P_{int}=P_{ext}$), the sealing element will expand into the interior of the pipeline. However, since the lateral compressive forces exerted by the walls of the aperture are still present (the sealing element being larger than the aperture at $P_{ext}$), the sealing element 30 is held in place, and continues to seal the leak, thereby maintaining the seal between the inside and the outside of the pipe wall, despite the reduction of the pressure within the pipeline.

In the second embodiment, the sealing element is dependent upon the coefficient of friction between the sealing element and the wall of the aperture, the contact area between the sealing element and the wall of the aperture, and the cross sectional area of the aperture (ie, the cross sectional area in a plane substantially parallel to the transport of fluid along the duct).

In particular, the sealing method relies on the force due to friction between the sealing element and the walls of the aperture being greater than the force due to the internal pressure within the duct. In this respect, once the sealing element is static in the aperture, the full differential pressure ($P_{int}-P_{ext}$) acts across it. Two distinct forces thus act upon the sealing element. Namely, the frictional force, which keeps the sealing element static, and the ejection force, which acts against the frictional force.

The ejection force which acts upon the sealing element is given by:

$$F_e=(F_{int}-P_{ext})A_{aperture} \qquad (5)$$

where $F_e$ is the ejection force acting on the sealing element, $P_{int}$ is the internal pressure in the duct during deployment of the sealing element, $P_{ext}$ is the pressure outside the pipeline and $A_{aperture}$ is the cross sectional area of the aperture.

The frictional force acting upon the sealing element is given by:

$$F_s=\mu_s N \qquad (6)$$

where $F_s$ is the static frictional force, $\mu_s$ is the static coefficient of friction between the sealing element and the wall of the aperture, and N is the force exerted by expansion of the sealing element normal to the wall of the aperture.

For the sealing element to come to rest during the sealing operation, the dynamic friction acting on the sealing element must be greater than the ejection force. Dynamic friction is given by:

$$F_d=\mu_d N \qquad (7)$$

where $F_d$ is the dynamic frictional force, and $\mu_d$ is the dynamic coefficient of friction between the sealing element and the wall of the aperture.

The normal force N is due to the expansion of the sealing element against the wall of the aperture. Accordingly, the force is greatest when the sealing element is close in size to the size of the aperture at the deployment pressure of the pipeline (i.e., the pressure of the pipeline during deployment of the sealing element), since this represents the largest sealing element which can be drawn into the aperture in the manner described above.

The normal force N due to the full expansion under the pressure differential $P_{int}-P_{ext}$ is given by:

$$N=(P_{int}-P_{ext})A_{contact} \qquad (8)$$

where $A_{contact}$ is the contact area between the sealing element and the wall of the aperture.

For the sealing element to become lodged in the aperture, the dynamic frictional force $F_d$ must be greater than the ejection force $F_e$. I.e.:

$$F_d>F_e \qquad (9)$$

Substituting (5), (7) and (8) in (9) gives:

$$\mu_d(P_{int}-P_{ext})A_{contact} > (P_{int}-P_{ext})A_{aperture} \quad (10)$$

or:

$$\mu_d A_{contact} A_{aperture} \quad (11)$$

This is the condition for sealing.

The normal force N acts in three zones, as illustrated in FIG. 8. FIG. 8 shows a section of a duct wall 24 in which an aperture 22, similar in geometry to that of FIGS. 4a to 4e and 5a to 5e is sealed by a sealing element 80. In this figure, the duct interior is illustrated as above the section of pipe wall 24. The innermost position within the duct wall where the sealing element is in contact with the wall of the aperture around its full circumference may be regarded as the seal level or seal line 81. Above this level (towards the interior of the pipe), is the internal pressure zone 82, where the pressure acting on the sealing element is the internal pressure of the pipeline, $P_{int}$. Below this level (towards the outside of the duct), there is a transitional zone 83 in which the pressure acting on the sealing element drops from $P_{int}$ to the external pressure outside the pipeline, $P_{ext}$. Below the transitional level, there is an external pressure zone 84 where the sealing element is subject to $P_{ext}$.

In the internal pressure zone, there is no force exerted by the sealing element. In the transitional zone, the force increases from zero to the maximum force. This maximum force is exerted throughout the external pressure zone.

$A_{contact}$ can be considered to be the area of contact in the external pressure zone. Thus, for the leak geometry of FIG. 8, the condition for sealing, (11), can be rewritten as:

$$\mu_d 2\pi r l > \pi r^2 \quad (12)$$

which simplifies to:

$$\mu_d 2l > r \quad (13)$$

where r is the radius of the aperture, and l is the length of the external pressure zone.

Accordingly, from (13), it can be seen that, provided the length of the external pressure zone is greater than the radius of the aperture, a sealing element with even a relatively low coefficient of friction (for example, less than 0.5) can be made to achieve a seal. The use of rubbers for which $\mu_d$ is of the order of 0.6 allows for apertures for which the external pressure zone is equal to the radius of the aperture.

In certain types of pipeline, such as very deep sub-sea pipelines, the transport pressure of the pipeline may not be significantly larger than the external pressure. Both the above described embodiments of the present invention may be particularly useful in such cases, because in these types of pipeline a relatively small drop in the transport pressure (for example due to a temporary loss of pumping pressure) can cause the transport pressure to approach the pressure outside the pipeline $P_{ext}$. In such instances known sealing methods which rely on a relatively high internal pressure $P_{int}$ to maintain the seal, are unreliable.

If the transport pressure of the pipeline drops sufficiently below the external pressure $P_{ext}$, a seal formed in accordance with the present invention will eventually be breached. However, for this to happen the reverse pressure differential $P'_{ext}-P'_{int}$ would have to rise to a level comparable with the pressure differential $P_{int}-P_{ext}$ under which the seal was formed. This is because the degree of contraction or pre-stressing that the sealing element undergoes when the seal is formed is related to the pressure within the pipeline $P_{int}$ at the time the leak was sealed.

In certain cases it can be desirable to increase, the internal pressure in the pipeline during the time when the sealing elements are deployed in the pipeline and the seals are formed. This increased pressure is referred to as the deployment pressure.

In these cases, the portion of the sealing element located outside the pipeline (with reference to FIGS. 4d and 5d) will expand first, while the internal pressure of the pipeline is equal to the deployment pressure. Thereafter, as the internal pressure is reduced to the transport pressure, the portion of the sealing element located inside the pipeline will expand.

By controlling the composition and manufacture of the sealing elements such that the maximum expansion and contraction occurs in a pressure range which is suitable for the conditions in the pipe, the resistance to reduced or reversed pressures of particular sealing elements can be maximized for specific applications.

As described, the sealing elements are made from a closed cell material where the cells are filled with a fluid such as air. Alternative embodiments of the invention encompass filling the cavities with argon, nitrogen, hydrogen or helium. In further alternative embodiments, the cavities may be filled with a mixture of these gases, and/or with other fluids chosen to accommodate the requirements of differing ducts, duct environments and fluid transport parameters. It is further envisaged that complex sealing elements may be fabricated from individual sections with differing fluid fills.

The pressure of the gas in the cells is the manufacturing pressure $P_{man}$. In order to achieve the maximum expansion of the sealing elements as the pressure in the pipeline drops from the deployment pressure to the transport pressure, the manufacturing pressure should be greater than or equal to the transport pressure of the pipeline.

Thus, the manufacturing pressure $P_{man}$ and the deployment pressure $P_{dep}$ represent constants which can be used to control the design and implementation of the sealing elements in accordance with the present invention.

In practice, both the external and internal pressures $P_{ext}$ and $P_{int}$ may vary. However, for practical purposes, set values can be prescribed. For a pipeline located in the sea, the external pressure $P_{ext}$ can be determined by the hydrostatic pressure based on water depth. That is to say:

$$P_{ext} = \rho g H \quad (14)$$

where g is the acceleration due to gravity, H is the depth below the surface of the water and p is the density of sea water.

Thus, for a pipeline at a depth of 100 m in sea water with a density of $\rho=1030$ kg/m$^3$, the external pressure $P_{ext} \approx 1030000$ Pa=10.3 bar. The effect of wave height is negligible except for pipelines at shallow depths in high wave conditions.

If the internal pressure is not raised during or prior to deployment of the sealing elements, the sealing elements are deployed at the normal internal or transport pressure of the pipeline.

Figure 6:
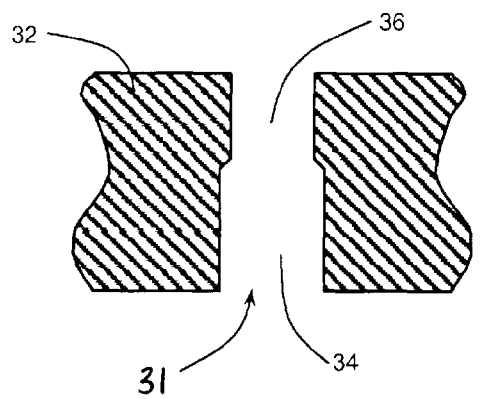
FIG. 6 is a cross-section through a portion of a duct wall with an aperture which causes a leak when fluid is transported along the duct.

Sealing elements which embody the present invention have been tested for a leak having the geometry illustrated in FIG. 6. The leak is constituted by a two-part aperture 31 formed in a duct wall 32 having a circular cross-section, extending through the thickness of the duct wall, such that the longitudinal axis of the aperture coincides with the wall normal axis of the duct, z. The cross-section of the first part of the aperture 34 has a constant diameter of 6 mm, and extends from the internal surface of the duct wall to a point part way through the thickness of the wall, whilst the second part 36 has a diameter of 4.5 mm, and continues through the thickness of the wall to form an opening on the external surface of the duct wall.

Different sized cubes of closed cell foam material were introduced into a pipeline and their behaviour observed under different pressure conditions. As a comparison, cubes of substantially incompressible Polyurethane (PUR) were also introduced into the pipeline, and their behaviour observed under different pressure conditions.

The results of these tests are summarized in Table 1.

TABLE 1

|  | Length of cube edge at atmospheric pressure (mm) | Positive sealing pressure (bar) | Maximum resistance to reverse pressure (bar) |
|---|---|---|---|
| Closed cell foam | 10 | 6 | 2.4 |
|  | 15 | 20 | 10 |
| Polyurethane | 10 | 15 | 0 |
|  | 8 | 6 | 1.8 |

A cube of closed cell foam with a 10 mm edge length at the manufacturing pressure $P_{man}$, which in this case is equal to atmospheric pressure (approximately 1 bar or 100 kPa), sealed the leak against positive pressures of up to 6 bar (600 kPa), and reverse pressures of up to 2.4 bar (240 kPa). A cube of the same material with a 15 mm edge length at 1 bar sealed the leak against positive pressures of up to bar (2 MPa), and reverse pressures of up to 10 bar (1 MPa).

In contrast, a polyurethane cube with edge length 10 mm at 1 bar (100 kPa) was able to seal the leak against positive pressures of up to 15 bar (1.5 MPa), but was not able to withstand reversal of the pressure. A polyurethane cube with edge length 8 mm was able to seal the leak against positive pressures of up to 6 bar (600 kPa), but was only able to seal the leak against reverse pressures of up to 1.8 bar (180 kPa).

From these results, it can be seen that whilst the mm polyurethane cube would provide a good seal under normal operating conditions, the seal does not survive a reversal of the pressure. In contrast, the closed cell foam cubes which embody the present invention are able to provide a good seal under normal operating conditions, and maintain their sealing ability under a reversal of the pressure.

Since the internal surface of the aperture which is in contact with the sealing element is perpendicular to the action of applied pressure, friction between the aperture wall and the sealing element opposes the action of applied pressure. Approximate calculations find the pressure exerted by the sealing element on the aperture wall as 740 kPa. It is to be realised however that no matter what the geometry of the aperture or the sealing element, the frictional forces between a sealing element and the pipe wall act to provide an effective seal.

The closed cell material from which the sealing elements are formed has a number of specific design parameters to control its pressure sensitivity. The material consists of a percentage of solid and a percentage of gas.

The theoretical relationship of volume and pressure for materials consisting of different percentages of solid and gas is illustrated in FIG. 7. An ideal solid (100% solid) is incompressible and thus does not change in volume when placed under pressure. This is illustrated by line 50 on the graph of FIG. 7. An ideal gas (100% gas) will undergo a change in volume which is inversely proportional to the pressure applied. Thus, the volume tends towards zero as the pressure increases. This is illustrated by line 52 on the graph of FIG. 7. If a volume of gas is encased within a solid material, for example, in the form of a closed cell foam, the overall volume will therefore tend towards the total volume of the solid material as the pressure increases. Thus, if the material consists of 50% solid and 50% gas at zero pressure, the material will tend towards 50% of the original volume as the pressure increases. This is illustrated by lines 54 and 56 on the graph of FIG. 7.

In addition, in a closed cell foam, the solid material will exhibit strength (resistance to compression) which relates to the amount of pressure required to reduce the volume. For example, lines 54 and 56 on the graph of FIG. 7 show the pressure/volume relationship where the solid encasing the gas is relatively weak (line 54) as compared to the case where the solid encasing the gas is relatively strong (line 56).

The material is selected to be sufficiently elastic, such that the compression of the material under pressure is reversible when the pressure is subsequently reduced.

Table 2 gives values for a cubic sample of expanded Ethylene Propylene Diene Monomer (EPDM) when placed under pressure.

TABLE 2

| Pressure (bar) | Edge-length (mm) | Length reduction (mm) | Volume reduction (mm³) |
|---|---|---|---|
| 0 | 24.5 | 1 | 1 |
| 1 | 21 | 0.857 | 0.63 |
| 2 | 18 | 0.735 | 0.397 |
| 3 | 16.5 | 0.673 | 0.305 |
| 4 | 14.5 | 0.592 | 0.207 |
| 5 | 13.5 | 0.551 | 0.167 |
| 6 | 13 | 0.531 | 0.149 |
| 8 | 12 | 0.49 | 0.118 |

These values are compared to the behaviour of an ideal gas in the graph of FIG. 7. It can be seen that the closed cell material exhibits a slight additional resistance to the externally applied pressure when compared with the ideal gas. However, since it has a high proportion of gas to solid, and the solid is relatively weak, overall the material exhibits a high degree of volume change under compression.

In predicting the behaviour of the sealing elements of the present invention, it can be assumed that the volume of the solid in the sealing element varies negligibly with pressure, as compared to the volume change of the gas. Thus the overall volume change of the sealing element can be taken to be due to the volume change of the gas contained in the sealing element.

The product of pressure and volume of the gas must be a constant. Thus, if $P_0$ is atmospheric pressure (approximately 1 bar or 100 kPa), $P_1$ is an increased pressure ($P_1 > P_0$), $V_{g0}$ is the volume of the gas in the sealing element at atmospheric pressure and $V_{g1}$ is the volume of the gas in the sealing element at $P_1$, then $$P_0 V_{g0} = P_1 V_{g1} \qquad (15)$$

If s is the volume fraction of solid material in the sealing element at atmospheric pressure $P_0$, then 1-s represents the volume fraction of the gas at atmospheric pressure $P_0$. Thus, $$P_1 V_{g1} = P_0 (1-s) V_0 \qquad (16)$$

therefore $$V_{g1} = P_0 (1-s)/P_1 \qquad (17)$$

The total volume of the sealing element at pressure $P_1$ is given by:

$$V_1 = V_{s1} + V_{g1} \qquad (18)$$

where $V_{s1}$ is the volume of the solid in the sealing element at $P_1$. Using (17) and (18):

$$V_1 = sV_0 + P_0(1-s)V_0/P_1 \quad (19)$$
$$= V_0[s + P_0(1/s)/P_1]$$

For a cubic sealing element, the effective length dimension of the sealing element at atmospheric pressure, $D_0 = V_0^{1/3}$ and the effective length dimension of the sealing element at $P_1$ is $D_1 = V_1^{1/3}$.

As an example, a cubic sealing element for which $D_0 = 10$ mm (and thus $V_0 = 1000$ mm$^3$) at atmospheric pressure ($P_0 = 1$ bar=100 kPa) is deployed in a pipeline operating at $P_1 = 10$ bar=1 MPa. If the volume fraction of solid material at atmospheric pressure is $s = 0.5$, then, using (19), the volume of the sealing element in the pipeline will be $V_1 = 550$ mm$^3$, and thus the effective length of the sealing element will be $D_1 = 8.2$ mm.

Alternatively, if the volume fraction of solid material at atmospheric pressure is $s = 0.1$, then the volume of the sealing element in the pipeline will be $V_1 = 109$ mm$^3$, and thus the effective length of the sealing element will be $D_1 = 4.8$ mm.

In another example, cubic sealing elements having a side of length $D_0 = 4$ mm and a solid to gas ratio of $s = 0.3$ at atmospheric pressure are injected into a gas pipeline operating at 20 bar and having a leak of effective size 2 mm. The volume of the sealing element at the operating pressure of the pipeline is therefore 21.5 mm$^3$ (using (19)), and thus the length of the side of the sealing element at this pressure is 2.8 mm. This is larger than the leak aperture, so an initial seal will be created when the sealing element initially comes into contact with the aperture to produce the required expansion of the sealing element into the aperture.

As will be appreciated from the calculations above, the rate of change of volume with pressure can be controlled by adjusting the ratio of solid to gas in the sealing element. The preferred range of solid to gas ratios is $0.01 \leq s \leq 0.5$.

The aperture may be defined in terms of its maximum dimension $x_L$ and its maximum width in an orthogonal direction $y_L$ as having an effective size given by:—

$$D_L = (x_L^2 y_L^2)^{1/2} \quad (20)$$

The sealing element may be defined in terms of its dimensions a, b and c in mutually orthogonal directions as having an effective size (at a given pressure) $D_E$ given by:—

$$D_E = (a^2 b^2 c^2)^{1/2} \quad (21)$$

Alternatively, the effective size of the sealing elements may be defined as having an effective size (at a given pressure) $D_E$ given by:—

$$D_E = \tfrac{1}{3}(a^2 b^2 c^2)^{1/2} \quad (22)$$

By way of example, for an approximately circular or square pinhole aperture, $x_L$ equals $y_L$. Thus (20) reduces to $D_L \approx 2^{1/2} x_L$. Alternatively, in the case of seepage through a hairline crack, $y_L$ will be approximately zero, relative to $x_L$, and hence (20) reduces to $x_L$.

In the case of an approximately spherical or cubic sealing element a, b and c are substantially equal, and hence (21) reduces to $\approx 3^{1/2} a$. (22) would reduce to $3^{1/2} a/3$.

Although the manner in which the sealing element 20 operates has been described above with reference to a specific aperture, duct wall and sealing element, it is to be realised that the present invention is applicable to sealing elements, duct walls and apertures of various sizes and geometries.

With the present invention, a single sealing element may be introduced into a duct for the purpose of sealing a specific leak, or a plurality of sealing elements may be introduced into the duct, each being for the purpose of sealing a specific leak or a specific leak type.

The present invention has been described in terms of sealing a leak or leaks caused by apertures having a specific known geometry. However, it will be appreciated that the method can be used to seal leaks caused by apertures whose geometry is only approximately known. Moreover, the method can be used to seal leaks caused by apertures having a range of different sizes and geometries. In this case, different sealing elements with a range of properties can be selected for introduction into the pipeline.

The invention claimed is:

1. Apparatus for controlling leakage from a leak in a duct carrying a fluid at a known internal pressure, said apparatus comprising:—
   one or more sealing elements each comprising a solid in the form of an elastic material which contains one or more impermeable bubbles, the sealing elements to be introduced into the duct and capable of being transported along the duct by the flow of said fluid and capable of being drawn to the leak by the pressure differential in the region of the leak;
   characterised in that the bubble(s) in the one or more sealing elements are full of gas with the product of the volume of the bubble(s) and the pressure of the gas therein selected according to the internal pressure in the duct such that the pressure of the gas in the bubbles is greater than or equal to the internal pressure in the duct:—
   such that when introduced into the duct the sealing element(s) elastically contracts in response to the duct internal pressure as a result of the volume change of the gas contained in the bubble(s),
   such that when introduced into the duct the sealing element will have a transport volume at said internal pressure which is appropriate to flow into the region surrounding a leak and can be drawn towards and into the leak by the pressure differential in this region, and
   such that the sealing element will elastically expand from said transport volume in response to the reduced pressure associated with the locality of the leak sufficiently to seal that leak.

2. Apparatus according to claim 1 wherein the one or more sealing elements are selected to have, under said internal pressure, an effective size that is greater than the effective size of the leak.

3. Apparatus according to claim 2 wherein the one or more sealing elements are selected to have, under said internal pressure, an effective size that is at least 1.1 times greater than the effective size of the leak.

4. Apparatus according to claim 2 wherein the one or more sealing elements are selected to have, under said internal pressure, an effective size that is less than 3 times greater than the effective size of the leak.

5. Apparatus according to claim 2 wherein the effective size of the sealing element is the maximum cross sectional area thereof and the effective size of the leak is the minimum cross sectional area thereof in a plane substantially parallel to the transport of the fluid along the duct.

6. Apparatus according to claim 2 wherein the effective size of the sealing element is given by:

$$D_E = (a^2 + b^2 + c^2)^2$$

and the effective size of the leak is given by:

$$D_L = (x_L^2 + y_L^2)^{1/2}$$

where a, b and c are the dimensions of the sealing element in mutually orthogonal directions, $x_L$ is the maximum dimension of the leak, and $y_L$ is the maximum width of the leak in an orthogonal direction to $x_L$.

7. Apparatus according to claim 1 wherein the one or more sealing elements are selected to have, under said internal pressure, an effective size that is substantially equal to the effective size of the leak.

8. Apparatus according to claim 1 wherein the gas is lighter than air.

9. Apparatus according claim 1 wherein the gas comprises one or more of air, argon, nitrogen, hydrogen or helium.

10. Apparatus according to claim 1 wherein different bubbles encapsulate different gasses.

11. Apparatus according to claim 1 wherein the properties of the one or more sealing elements are, at least in part, determined by a manufacturing pressure under which the sealing element(s) are manufactured, and wherein the one or more sealing element(s) are selected to have a manufacturing pressure that is lower than said internal pressure and higher than the pressure outside the duct in the region of the leak.

12. Apparatus according to claim 1 wherein the properties of the one or more sealing elements are, at least in part, determined by a manufacturing pressure under which the sealing element(s) are manufactured, and wherein the ratio of solid material to fluid material by volume is between 0.01 and 0.5 at the manufacturing pressure.

13. Apparatus according to claim 12 wherein, under the manufacturing pressure, the ratio of solid material to fluid material by volume is substantially 0.3.

14. Apparatus according to claim 1 wherein the properties of the one or more sealing elements are, at least in part, determined by a manufacturing pressure under which the sealing element(s) are manufactured, and wherein the maximum linear dimension of each impermeable bubble is no greater than 20% of the maximum linear dimension of the respective sealing element.

15. Apparatus according to claim 1 wherein the one or more sealing elements are formed of closed cell foam, the closed cells thereof constituting said impermeable bubbles.

16. Apparatus according to claim 15 wherein the one or more sealing elements are formed from expanded Ethylene Propylene Diene Monomer (EPDM).

17. Apparatus according to claim 1 wherein the sealing elements are further selected to have substantially the same density as the fluid transported along the duct under said internal pressure.

18. A method of controlling leakage from a leak in a duct carrying a fluid at a known internal pressure, the method comprising:— transporting the fluid along the duct at an internal pressure that is higher than an external pressure outside the duct; and introducing one or more sealing elements into the duct such that the sealing element(s) are transported along the duct by the flow of said fluid and are drawn to the leak by the pressure differential in the region of the leak, wherein the one or more sealing elements each comprise a solid in the form of an elastic material which contains one or more impermeable bubbles;

characterised in that the bubble(s) in the one or more sealing elements are full of gas with the product of the volume of the bubble(s) and the pressure of the gas therein selected according to the internal pressure in the duct such that the pressure of the gas in the bubbles is greater than or equal to the internal pressure in the duct;— such that when introduced into the duct the sealing element elastically contracts in response to the duct internal pressure as a result of the volume change of the gas contained in the bubble(s), such that when introduced into the duct the sealing element will have a transport volume at said internal pressure which is appropriate to flow into the region surrounding a leak and can be drawn towards and into the leak by the pressure differential in this region, and such that the sealing element will elastically expand from said transport volume in response to the reduced pressure associated with the locality of the leak sufficiently to seal that leak.

19. A method according to claim 18 wherein said internal pressure is a deployment pressure which is higher than a transport pressure under which the fluid is transported along the duct during normal use.

* * * * *

UNITED STATES PATENT AND TRADEMARK OFFICE
CERTIFICATE OF CORRECTION

PATENT NO. : 8,950,437 B2  
APPLICATION NO. : 12/745142  
DATED : February 10, 2015  
INVENTOR(S) : Nicholas John Ryan et al.

Page 1 of 1

It is certified that error appears in the above-identified patent and that said Letters Patent is hereby corrected as shown below:

In The Claims

Column 15,
Claim 9, line 11, delete "Apparatus according claim 1" and insert -- Apparatus according to claim 1 --.

Signed and Sealed this
Twenty-ninth Day of March, 2016

Michelle K. Lee
*Director of the United States Patent and Trademark Office*